United States Patent

McKendall

[11] Patent Number: 6,028,949
[45] Date of Patent: Feb. 22, 2000

[54] METHOD OF VERIFYING THE PRESENCE OF AN EYE IN A CLOSE-UP IMAGE

[76] Inventor: Raymond A. McKendall, 4701 Pine St., Apartment B12, Philadelphia, Pa. 19143

[21] Appl. No.: 08/982,365

[22] Filed: Dec. 2, 1997

[51] Int. Cl.$^7$ .................................................. G06K 9/00
[52] U.S. Cl. ............................................................ 382/117
[58] Field of Search .................................... 382/115, 117; 351/204, 205, 206

[56] References Cited

U.S. PATENT DOCUMENTS

| | | | |
|---|---|---|---|
| 4,641,349 | 2/1987 | Flom et al. ................................. | 382/2 |
| 5,291,560 | 3/1994 | Daugman ................................ | 382/117 |
| 5,546,158 | 8/1996 | Konishi et al. ........................... | 354/410 |
| 5,784,145 | 4/1994 | Ghodse et al. ........................... | 351/205 |

OTHER PUBLICATIONS

*Procedural Elements for Computer Graphics*, Section 2–24, "A Scan Line Seed Fill Algorithm," by David F. Rogers, 1985, pp. 88–92.

*Primary Examiner*—Leo H. Boudreau
*Assistant Examiner*—Shawn B Cage

[57] ABSTRACT

A method for verifying that an eye is present and accurately located in an image that is used for identifying an individual using iris identification techniques begins with an image in which the eye is believed to be present at a selected location. The image is then subjected to a series of tests to confirm that an eye is present at the selected location.

16 Claims, 1 Drawing Sheet

METHOD OF VERIFYING THE PRESENCE OF AN EYE IN A CLOSE-UP IMAGE

FIELD OF THE INVENTION

The invention relates to identifying individuals from facial images, and more particularly from images of the eye.

BACKGROUND OF THE INVENTION

There are several methods known as biometrics for recognizing or identifying an individual from personal biological characteristics. Some of these methods involve imaging of the face or eye and analyzing the facial features, retinal vascular patterns of the eye, or patterns in the iris of the eye. In recent years there has been a demand for more reliable systems to identify individuals, particularly those persons who desire access to a secured area or system. A common example of such a secured system is an automated teller machine which allows authorized users to conduct banking transactions. Many of these systems are used by a wide variety of people. Very often these people demand quick as well as accurate identification.

A technique for accurately identifying individuals using iris recognition is described in U.S. Pat. No. 4,641,349 to Flom et al. and in U.S. Pat. No. 5,291,560 to Daugman. In this method an image of an eye of a human is acquired, the eye is determined to be present at a selected location in the image, an iris portion of the eye is isolated, and an iris code is generated and compared to a previously generated iris code. The systems described in these references require clear, well-focused images of the eye.

One particular problem in acquiring a good image of the eye is the problem of locating the eye within a close-up image obtained by the camera of an imaging system. Many factors can degrade the performance of methods of locating the eye. The features of the human eye have considerable variation, sometimes causing difficulty in recognizing and isolating the iris. Subject movement during imaging causes blurred images. The small size of the eye causes difficulty at distances of only 1 to 2 feet. With present technology, it is very difficult to compute an accurate range via machine vision for precise focusing at a reasonable cost. For all of these reasons, multiple methods may be required to locate an eye in a close-up image with confidence. The present invention is one effective means of verifying a previously estimated location of an eye in a close-up image.

SUMMARY OF THE INVENTION

I provide a reliable method for checking the location of an eye within an image. Given a close-up image and estimates of the center locations and radii of the pupil and the iris, I perform a series of tests to verify the estimates, checking co-location of the centers, checking the ratio of the radii, checking the mean and standard deviation of pupil pixels, and comparing an expanded pupil region to the original estimated pupil region. If all of these tests are passed, the original estimates are verified; otherwise, they are rejected.

DESCRIPTION OF THE PREFERRED EMBODIMENTS

Figure 1:
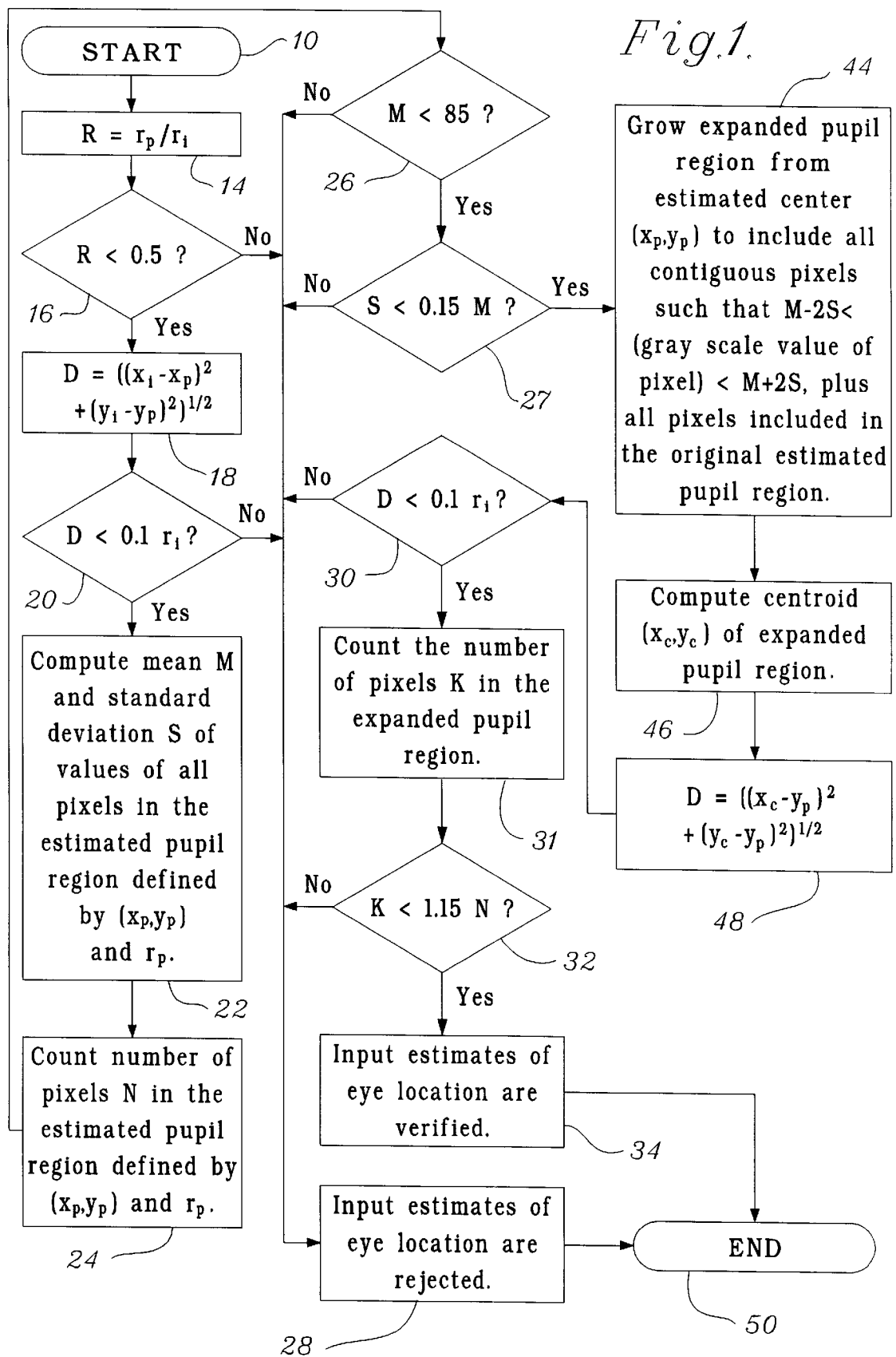
FIG. 1 is a flowchart of a preferred embodiment of the present invention.

Using a computer system with some standard video capture facility, such as a CCD video camera and video frame grabber, I obtain a close-up gray scale digital image that includes an image of an eye. The presence of the eye in the image may have been confirmed by other image processing techniques. My method is intended to confirm that the location of the pupil and the iris of the eye are adequately specified for further image processing, particularly iris identification. First, I use methods that make probable estimates of the location of the center of the pupil, $(x_p, y_p)$, the center of the iris, $(x_i, y_i)$, the radius of the pupil, $r_p$, and the radius of the iris, $r_i$. (In these coordinates, x is the horizontal axis in the image and y is the vertical axis in the image.) Then I process this image according to the method of the present invention.

I begin at step 10 in FIG. 1 with the aforementioned close-up image and associated estimates. I proceed to a series of tests of these estimates with the simpler tests used first so that rejection of the estimates by an earlier, simpler test may preclude the computation needed for the more complex, later tests.

In step 14, I calculate the ratio R of the pupil radius to the iris radius. In step 16, 1 test this ratio. I check that R is less than 0.5. If this test fails, the estimates are rejected. The threshold of this test is empirically derived.

In step 18, I compute the distance D between the center of the iris and the center of the pupil for an image that passes the test of step 16. I check that D is less than $0.1\ r_i$ (step 20). If this test fails, the estimates are rejected (step 28). The threshold for this test is empirically derived.

In step 22, I calculate the mean and standard deviation of the gray scale values of all of the pixels in the estimated pupil region defined by the disk having center $(x_p, y_p)$ and radius $r_p$. Other measures of central value (for example, median) and spread (for example, range) may also be used.

In step 24, I count the number of pixels N in the estimated pupil region.

In step 26, I check that the mean gray scale value of the estimated pupil region is less than one-third of the maximum value of the gray scale, 255 for an 8-bit gray scale. Thus the threshold value is 85 as shown. If the test fails, the estimates are rejected (step 28). This threshold is derived empirically.

In step 27, I check that the standard deviation of the pupil gray scale values is less than 15% of the mean. If the test fails, the estimates are rejected (step 28). This threshold is derived empirically.

If all of the aforementioned tests are passed, I grow an expanded pupil region from the originally estimated pupil region for additional tests.

In step 44, I grow an expanded pupil region from the estimated center $(x_p, y_p)$ to include all pixels in the original estimated pupil region plus all contiguous pixels having a gray scale value between M−2S and M+2S. (The distance from the mean M in the test of step 38 is derived empirically and may vary from 1 to 3 standard deviations.) This growth process is done according to prior art that may be found in *Procedural Elements for Computer Graphics* by David F. Rogers, McGraw-Hill (1985), pp. 88–92.

Next I compute the centroid $(x_c, y_c)$ of the expanded pupil region (step 46). In step 48, I compute the distance D between $(x_c, y_c)$ and $(x_p, y_p)$. I then check that $D<0.1\ r_i$ (step 30). If this test fails, the estimates are rejected. The threshold of this test is empirically derived.

In step 31, I count the number of pixels K in the expanded pupil region. In step 32, I check that K<1.15 N (step 32). If this test fails, the estimates are rejected. The thresholds of this test is empirically derived.

All of the empirically derived thresholds are determined using many test images with variations due to ranges of ambient conditions, hardware specifications, and hardware controls. Thus these thresholds may change substantially depending on the details of the iris identification system, or other system, in which this method is used.

If all of the aforementioned tests are passed, the original estimates are accepted (step 34) and I accept the image for use in an iris identification process to identify the subject whose eye is in the image. This identification may involve further processing of the image and subjecting that image to the iris identification techniques described in U.S. Pat. No. 4,641,349 to Flom et al. and in U.S. Pat. No. 5,291,560 to Daugman. Iris identification can be used to confirm that the person in the image is authorized to have access to a secure system such as an automated teller machine or a restricted area. If the person is authorized then access is granted.

Although I prefer to use all of the tests described here in the sequence that I have described them, it is not necessary to do this. One could perform the tests in a different order and use some but not all of the tests. However, if fewer tests are used the level of confidence in the result will be lower. If the tests are performed in a different order the process may take longer.

Although I have shown and described certain present preferred embodiments of my method it should be distinctly understood that my invention is not limited thereto but may be variously embodied within the scope of the following claims.

I claim:

1. A method for verifying that an eye is present in an image comprised of pixels each having an x, y coordinate location in the image and determining its location comprised of the steps of:
    a. selecting an image which is believed to contain an eye having an iris comprised of a set of pixels and a pupil comprised of a second set of pixels, a radius of the pupil being given as $r_p$ and a radius of the iris being given as $r_i$; and the eye is believed to be located at a selected location;
    b. computing $r_p/r_i$
    c. if $r_p/r_i$ is less than 0.5 then determining a centerpoint $x_i$; $y_i$ of the iris and a centerpoint $x_p$; $y_p$ of the pupil and calculating $$D=((x_i-x_p)^2+(y_i-y_p)^2)^{1/2}$$

d. if $D<0.1\ r_i$ reporting an eye image is present at the selected location; and
    e. if $r_p/r_i$ is greater than or equal to 0.5 or D is greater than or equal to $0.1\ r_i$ then concluding that an eye is not present at the selected location.

2. The method of claim 1 also comprising the steps of;
    a. computing a mean M of values of all pixels in a region corresponding to the pupil in the image;
    b. if M is not less than 85 then computing a standard deviation S of values of all pixels in a region corresponding to the pupil in the image; and
    c. if M is greater than 85 or if S is greater than 0.1M then concluding that an eye is not present at the selected location.

3. The method of claim 1 also comprising the steps of:
    f. growing an expanded pupil to include all pixels adjacent the pupil pixels which have a value V within the range M−2S<V<M+2S;
    g. computing a centroid of the expanded pupil; and
    h. repeating steps b through g for the expanded pupil.

4. The method of claim 1 also comprising the step of comparing at least a portion of the image to a portion of a file image believed to be a match.

5. The method of claim 1 wherein all steps are performed by a computer.

6. The method of claim 1 also comprising the step of storing the image which is selected.

7. A method for verifying that an eye is present in an image comprised of pixels each having an x, y coordinate location in the image and determining its location comprised of the steps of:
    a. selecting an image which is believed to contain an eye having an iris comprised of a set of pixels and a pupil comprised of a second set of pixels, a radius of the pupil being given as $r_p$ and a radius of the iris being given as $r_i$; and the eye is believed to be located at a selected location;
    b. computing $r_p/r_i$
    c. if $r_p/r_i$ is less than 0.5 then determining a centerpoint $x_i$; $y_i$ of the iris and a centerpoint $x_p$; $y_p$ of the pupil and calculating $$D=((x_i-x_p)^2+(y_i-y_p)^2)^{1/2}$$

d. if $D<0.1\ r_i$ reporting an eye image is present at the selected location;
    e. if $r_p/r_i$ is greater than or equal to 0.5 or D is greater than or equal to $0.1\ r_i$ then concluding that an eye is not present at the selected location;
    f. if $r_p/r_i$ is less than 0.5 and D is less than $0.1\ r_i$ then computing a mean M of values of all pixels in a region corresponding to the pupil in the image;
    g. if M is not less than 85 then computing a standard deviation S of values of all pixels in a region corresponding to the pupil in the image;
    h. if M is greater than or equal to 85 or if S is greater than or equal to 0.1M then concluding that an eye is not present at the selected location;
    i. if M is less than 85 and if S is less than 0.1M selecting each pixel adjacent the pupil pixels and for each selected pixel determining if a value for that pixel V is within the range M−2S<V<M+2S;
    j. growing an expanded pupil to include all pixels adjacent the pupil pixels which have a value V within the range M−2S<V<M+2S;
    k. computing a centroid of the expanded pupil; and
    l. repeating steps b through k for the expanded pupil.

8. The method of claim 7 also comprising the step of comparing at least a portion of the image to a portion of a file image believed to be a match.

9. The method of claim 7 wherein all steps are performed by a computer.

10. The method of claim 7 also comprising the step of storing the image which is selected.

11. An improved method for identifying a particular individual of the type in which an image of an eye of a human having a pupil and an iris is acquired, the eye is determined to be present at a selected location in the image, a radius of the pupil being given as $r_p$ and a radius of the iris being given as $r_i$, an iris portion of the eye is isolated, and an iris code is generated and compared to a previously generated iris code wherein the improvement comprises verifying that an eye is present in the image at a selected location prior to generating an iris code in which verifying is comprised of:

b. computing $r_p/r_i$ c. if $r_p/r_i$ is less than 0.5 then determining a centerpoint $x_i$; $y_i$ of the iris and a centerpoint $x_p$; $y_p$ of the pupil and calculating $$D=((x_i-x_p)^2+(y_i-y_p)^2)^{1/2}$$

d. if $D<0.1\ r_i$ reporting an eye image is present at the selected location; and e. if $r_p/r_i$ is greater than or equal to 0.5 or D is greater than or equal to $0.1\ r_i$ then concluding that an eye is not present at the selected location.

12. The method of claim 11 also comprising the steps of;

a. computing a mean M of values of all pixels in a region corresponding to the pupil in the image;

b. if M is not less than 85 then computing a standard deviation S of values of all pixels in a region corresponding to the pupil in the image; and c. if M is greater than 85 or if S is greater than 0.1M then concluding that an eye is not present at the selected location.

13. The method of claim 11 also comprising the steps of:

f. growing an expanded pupil to include all pixels adjacent the pupil pixels which have a value V within the range M−2S<V<M+2S;

g. computing a centroid of the expanded pupil; and h. repeating steps b through g for the expanded pupil.

14. The method of claim 11 also comprising the step of comparing at least a portion of the image to a portion of a file image believed to be a match.

15. The method of claim 11 wherein all steps are performed by a computer.

16. The method of claim 11 also comprising the step of storing the image which is selected.

* * * * *